Dec. 15, 1931.     H. C. MORRIS     1,836,036
AUTOMATIC SHAPER FEEDING DEVICE
Filed July 22, 1930
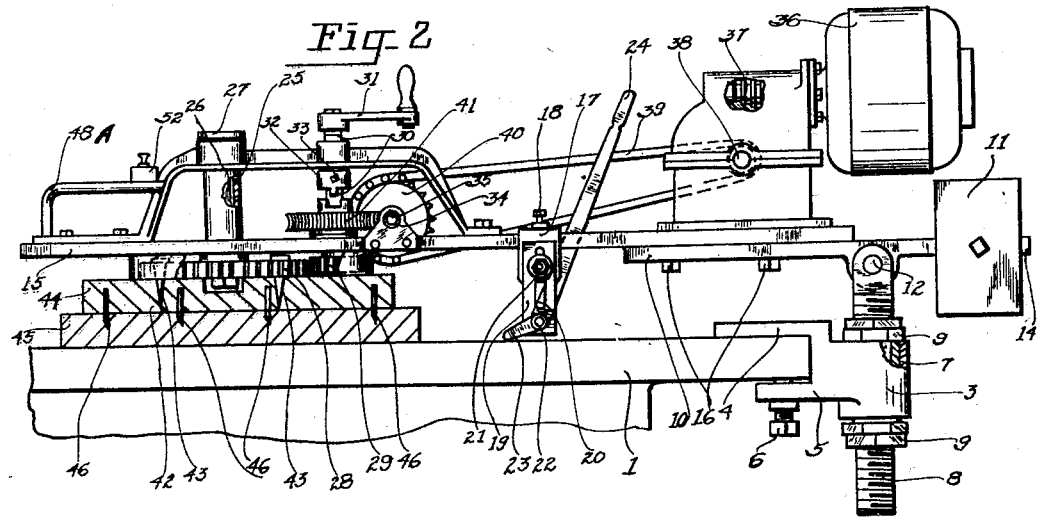
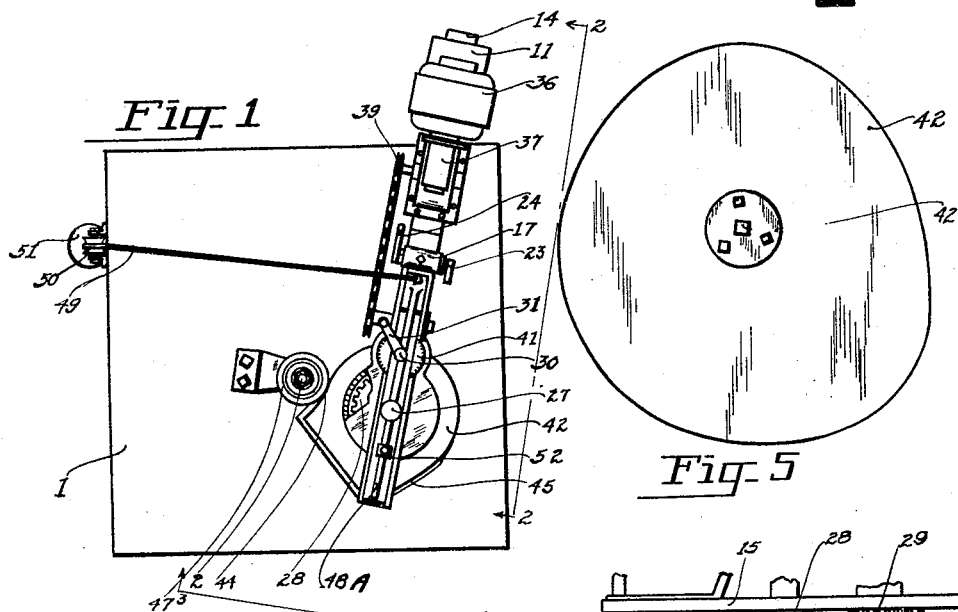
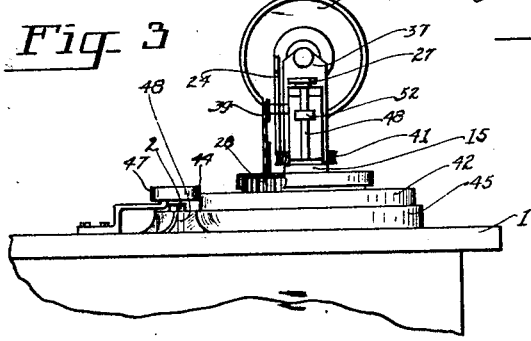
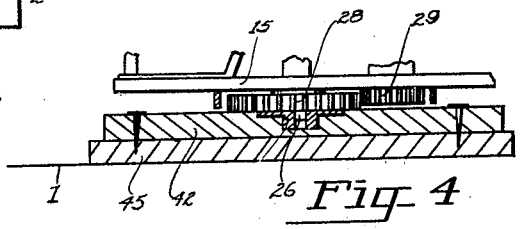
Hubert C Morris
INVENTOR
BY
ATTORNEY Patented Dec. 15, 1931

1,836,036

UNITED STATES PATENT OFFICE

HUBERT C. MORRIS, OF ALBANY, OREGON

AUTOMATIC SHAPER FEEDING DEVICE

Application filed July 22, 1930. Serial No. 469,687.

The primary purpose and object of my device resides in its adaptability to wood working shapers of the relatively high speed type.

The device relates to automatic feeding devices for wood working shapers and consists primarily of an overhead arm or frame that is adapted to being raised about a horizontal spindle and that is adapted to being swung about a vertical spindle to facilitate the placing of work pieces within the device and to swing the work into and away from the spindle head of the shaper. Means are carried within the arm or frame for rotating the piece to be finished either manually or automatically. Simple and efficient means are provided for holding the work to be finished relative to the form and to the quick and easy removal of the finished work from the form after the same has been machined. The device is readily adaptable to and removable from any standard wood working shaper.

One of the objects of my invention consists in providing a device that is adaptable to finishing the work relative to the surface of the table of the shaper. In devices heretofore made the finish cut is made relative to a face of the piece to be machined that is the opposite face of the work to that contacting with the shaper table. In my new and improved device the face of the work to be finished is contacted with the shaper table and the finish is made relative thereto. In so doing the variance of thickness in the stock being finished is reflected at the back of the stock rather than in the face as heretofore done.

A still further object of my new and improved device resides in its adaptability to any standard shaper and that may be easily and quickly applied and removed when other work is to be done on the shaper that cannot be done by my device.

A further object of my device resides in a construction that is adapted to manual or automatic feeding as desired by the operator and required by the piece to be finished as well as demanded by the kind and character of the wood to be finished.

A still further object of my device resides in a simplified construction and in the use of simplified forms or patterns. All that is required is to shape or form a pattern of wood or other fibrous material that may be shaped or patterned on the band saw or other tool that has a contour on its outer periphery similar to the work to be done. This form is made to engage the rub collar disposed upon the shaper spindle and a finish is formed on the work piece to be machined that is placed immediately beneath the form. Spurs are placed within the base of the form that are made to engage the underside of the work to be finished. The underside of the work to be finished is placed up relative to the shaper table and therefore is the top during the finishing operation. A guard or shield is placed over the driving elements to maintain the same in a working condition and relatively free from chips, shavings, splinters and the like.

Where the work to be finished is to be used in pairs as table top elements, lids, covers, and the like that are to be hinged or otherwise finished, or where the same are made semicircular or to be finished and used as pairs; the same may be placed relative to the form in pairs and finished as such in a single finishing operation.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings:

Fig. 1 is a top plan view of a shaper table showing one of my new and improved feeding devices placed thereupon.

Fig. 2 is a side view, partially in section of the assembled device in place upon a shaper table. The same being taken on line 2—2 of Fig. 1, looking in the direction indicated.

Fig. 3 is an end view of the assembled device. The same being taken on line 3—3 of Fig. 1, looking in the direction indicated.

Fig. 4 is a sectional, end view, of the engaging end of the frame, to which the form is to be secured and illustrates a means for maintaining the form relative to the frame and of maintaining the piece to be finished relative to the form.

Fig. 5 is a top, plan view, of a simplified form. This form is to be used in a relatively large production and has a permanent center of engaging fastening secured thereto which is adapted to engagement with the arm or frame of the device and permits of a frequent changing and removal therefrom.

Like reference characters refer to like parts throughout the several views.

I have here shown at 1 a shaper table that may be made of any form or shape and of any material. A spindle 2 upwardly extends through the table. The spindle is of the relatively high speed type having a plurality of cutter knives secured thereto. In shaper heads carrying this type of cutter head wood of varying degrees of hardness may be shaped and finished irrespective of the character or position of the grain and a uniform quality or finish be imparted thereto.

The device may be adapted to any form of shaper table. A supporting clamp 3 is provided having a top surface 4 that is made to engage one of the surfaces of the table and a lug 5 is made to extend in spaced relation with the surface 4 in order that the table 1 may be made to extend therebetween. The supporting vamp is secured to the table by any suitable fastening means, as by a set screw 6. A suitable bearing 7 is placed within the clamp into which the vertical spindle 8 is made to engage. Suitable adjusting and locking nuts 9 are placed at either end of the bearing 7 to position and maintain the spindle at the proper working height relative to the table 1 and the shaper spindle 2. When properly adjusted the spindle 8 and bearing 7 may be rotated relative to the clamp 3. A platform 10 carrying a counterweight 11 is secured to the upper end of the spindle 8. The connection between the platform 10 and the spindle 8 being made through the medium of a horizontal pin 12. This permits of a raising or tilting of the platform 10 relative to that of the spindle 5. A counterweight 11 is adjustably positioned about the free end 14 of the platform. An arm or frame 15 is removably secured to the platform 10 by any suitable fastening means, as by fastening elements 16. The arm or frame 15 may be made integral with the platform 10 when so desired. It is desirable to raise and lower the arm 15 for a limited amount only, to permit the placing of the piece to be finished thereunder and it is also desirable to raise and lower the arm a greater amount to facilitate the placing of the form. I place upon the arm a positioning yoke 17 that may be positioned along the arm and secured thereto, by the fastening element 18. Depending from the yoke 17 are adjustable arms 19. Slots 20 being disposed within the arm to position the same relative to the yoke. When the desired position is secured the same is clamped relative to the yoke by the adjustable clamping fastening 21. A horizontally disposed pin 22 is disposed the lower end of the arm 19 upon which a cam 23 is secured. The pin 22 is partially rotated through the hand lever 24. The positioning of the hand lever 24 engages the cam 23 with the upper surface of the table 1, and in doing so raises the arm 15. A vertical spindle bearing 25 is disposed the outer end of the arm 15 and a supporting pin 26 is disposed therein. The supporting pin 26 having a bearing head 27 disposed its upper end to maintain the same in place and to prevent the downward passage of the pin 26 through the bearing 25. Disposed upon the lower end of the pin 26 and immediately beneath the arm 15 is a driven element 28. The driven element 28 is in registerable alignment with and coacts with the driving element 29. The driving element 29 is positioned at the lower end of the shaft 30, the shaft 30 being adapted to being rotated through the hand lever 31. The shaft 30 carries an adjusting and locking collar 32 that may be positioned and secured to the shaft by any suitable fastening means, as by the fastening element 33. A worm 34 is disposed upon the shaft 35 which is driven from a prime mover 36. Because of a substantial reduction in the speed ratio being desired between the prime mover 36 and the shaft 30, a speed reducer 37 is interposed between the shaft of the prime mover 36 and the shaft 38, which is adapted for driving the belt or chain 39 that coacts with a pulley or sprocket 40 directly mounted upon the shaft 35. The worm 34 coacts with and drives a worm wheel 41. The worm wheel 41 normally idles upon the shaft 30 and during such period the shaft 30 is driven or rotated through the hand manipulation of the crank 31 which is removably secured to the shaft 30, but when it is desired to operate the machine as an automatic power driven mechanism, the crank 31 is removed from the shaft 30 and the collar 32 is made to engage the worm wheel 41, at which time, upon the driving of the prime mover 36, the device becomes an automatic power driven device. A form 42 which conforms to the shape and size and form of the material to be finished is positioned and secured to the driven element 28 and where a large production is to be made of a relatively hard material, and the same may be directly secured to the underside of the pin 26 by threaded engagement or otherwise, but where few parts are to be made and infrequent changes are required, the form 42 may be secured to the driving element 28 by any suitable means, as by screws 43. The outer periphery 44 of the form 42 is made to conform in shape and appearance to that of the material to be finished. The element to be finished, is illustrated at 45, and is secured to the form 42 by any suitable means, as by spurs 46. The number and size of the spurs 46 will be determined by the size and character of the work. The material to be finished is placed face down upon the table 1, of the shaper and a forcible contact is created between the form 42 and the work to be finished so that the spurs 46 are made to engage the back or upper side of the material to be finished. A rubbing collar 47 is positioned above and in spaced relationship with the cutter head 48, so that the form 42 is made to engage with the rubbing collar 47, thus positioning the material to be finished relative to that of the cutter head. The rotation of the form 42 by hand or power means, rotates the work relative to that of the cutter head and thereby rotates the entire outer peripheral surface or edge of the material to be finished relative to that of the cutter head. A hand engaging handle 48A is placed on the outer end of the arm or frame 15, so that the operator may grasp the same in one hand as he rotates the crank 31 in the other, or, where an automatic feed is desired, a flexible cable 49 may be counterweighted about a pulley 50. The counterweight 51 being secured to the free end of the cable 49 will maintain the form 42 in intimate relationship with the rubbing collar and the rotation of the form by power means heretofore described maintains an automatic rotation of the work against the cutter head.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a shaper of an attaching clamp adapted to being removably secured to the shaper table, a spindle vertically disposed within a bearing in the clamp, and a counterweighted frame journaled about a horizontal shaft disposed within the upper end of the spindle to permit of the raising and lowering of the frame in a vertical plane, a yoke adjustably positioned relative to the arm or frame, means secured to the yoke for raising and lowering the arm or frame relative to the shaper table, a rotatable spindle disposed vertically adjacent the free end of the frame, selective means for rotating the spindle, and a removable form disposed at the bottom of the spindle.

2. In a device of the class described, in combination with a shaper of a frame or arm having attaching means disposed at one end of the frame to attach the same to the shaper, means associated between the frame and the attaching elements permitting the swinging of the frame in a vertical and in a horizontal plane, an adjustable cam associated between the frame and the attaching elements permitting the swinging of the frame a predetermined amount in a vertical plane and simultaneously in a horizontal plane, a lever for actuating the cam, a driving and a driven element disposed at the free end of the frame, selective means for driving the associated driving elements, and a form removably secured to the bottom side of the driven element adapted for engagement with the rubbing collar disposed upon the spindle of the shaper.

3. In a device of the class described, the combination with a shaper table, a frame detachably attached to one end of the shaper table, means for detachably attaching the frame to the shaper table, a spindle vertically disposed within attaching means and having its free end forked to rockably maintain the frame upon the spindle, a driving and driven element disposed at the free end of the frame, a counter weight disposed at the oppositely disposed end of the frame in order to maintain a proper working balance of the associated elements, manually separable means disposed between the driving and driven elements and counter weight for permitting the raising of the frame for a predetermined distance, a form removably disposed upon the bottom of the driven element, and selective means for driving the driven element.

HUBERT C. MORRIS.